US006470106B2

(12) United States Patent
McClelland et al.

(10) Patent No.: US 6,470,106 B2
(45) Date of Patent: Oct. 22, 2002

(54) THERMALLY INDUCED PRESSURE PULSE OPERATED BI-STABLE OPTICAL SWITCH

(75) Inventors: Paul H McClelland, Monmouth, OR (US); Alfred Pan, Sunnyvale, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 78 days.

(21) Appl. No.: 09/755,676

(22) Filed: Jan. 5, 2001

(65) Prior Publication Data

US 2002/0090165 A1 Jul. 11, 2002

(51) Int. Cl.[7] .................................................. G02B 6/26
(52) U.S. Cl. ............................... 385/16; 385/8; 385/9; 385/39; 385/126
(58) Field of Search ........................... 385/8, 9, 16, 39, 385/126

(56) References Cited

U.S. PATENT DOCUMENTS

| 4,245,886 | A | | 1/1981 | Kolodzey et al. |
| 5,732,168 | A | | 3/1998 | Donald |
| 5,828,799 | A | | 10/1998 | Donald |
| 6,212,308 | B1 | * | 4/2001 | Donald ......................... 385/16 |
| 2002/0048425 | A1 | * | 4/2002 | McBride et al. ............... 385/16 |

* cited by examiner

Primary Examiner—Hung Xuan Dang
Assistant Examiner—Tuyen Tra
(74) Attorney, Agent, or Firm—Lucinda G. Price

(57) ABSTRACT

A thermal optical switching cell for controlling the transmission of light through optical channels that includes a switching conduit containing a working fluid that is index of refraction matched to the optical channels and an amount of light diverting material that is substantially immiscible in the working fluid and is not index of refraction matched to the optical channels. Micro heaters generate pressure pulses in the working fluid for moving the light diverting material between switch states.

15 Claims, 3 Drawing Sheets

THERMALLY INDUCED PRESSURE PULSE OPERATED BI-STABLE OPTICAL SWITCH

BACKGROUND OF THE INVENTION

The disclosed relates generally to micro switches, and more particularly to an optical bi-stable liquid micro switch.

Optical fibers are replacing conductive wires in telephone and data communications, since optical fibers provide extremely high bandwidth, are immune to radio frequency noise, and generate virtually no electromagnetic interference. As the cost of optical fibers decreases, use of optical fibers is expanding to applications that require switching to dynamically reconfigure the interconnection of optical signal paths.

A known approach to optical switching involves thermally controlling the presence or absence of liquid in a gap at which a plurality of optical waveguide segments or channels intersect. This approach can be implemented for example in an optical switching circuit that includes a waveguide substrate having a plurality of thermally actuated fluidic optical switches, and a heater substrate disposed adjacent the waveguide substrate. The heater substrate includes an array of heater resistors that selectively thermally actuate the optical switches, for example by forming drive bubbles to move fluid to move into and out of gaps in the waveguide substrate that transmit or reflect light as a function of the presence or absence of fluid.

Considerations with this known approach include the need for a low level constant power or frequent re-setting of the bubble states to maintain reliablity. Also, recurring "bubble pinning" (failure of the bubble to collapse) requires continual monitoring and active control of the substrate temperatue.

There is accordingly a need for a reliable optical switch.

SUMMARY OF THE INVENTION

The disclosed invention is directed to a thermal optical switch that includes a switch conduit comprised of a first chamber and a second chamber interconnected to the first chamber, a working fluid disposed in the switch conduit, a light diverting liquid that is immiscible with the working fluid and disposed in the switch conduit, a thermal pressure generator structure for causing the light diverting liquid to move between the first chamber and the second chamber, and a plurality of optical channels interfacing with the first chamber of the switch conduit. The state of the thermal optical switch is determined by the location of the switching liquid in the switch conduit.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
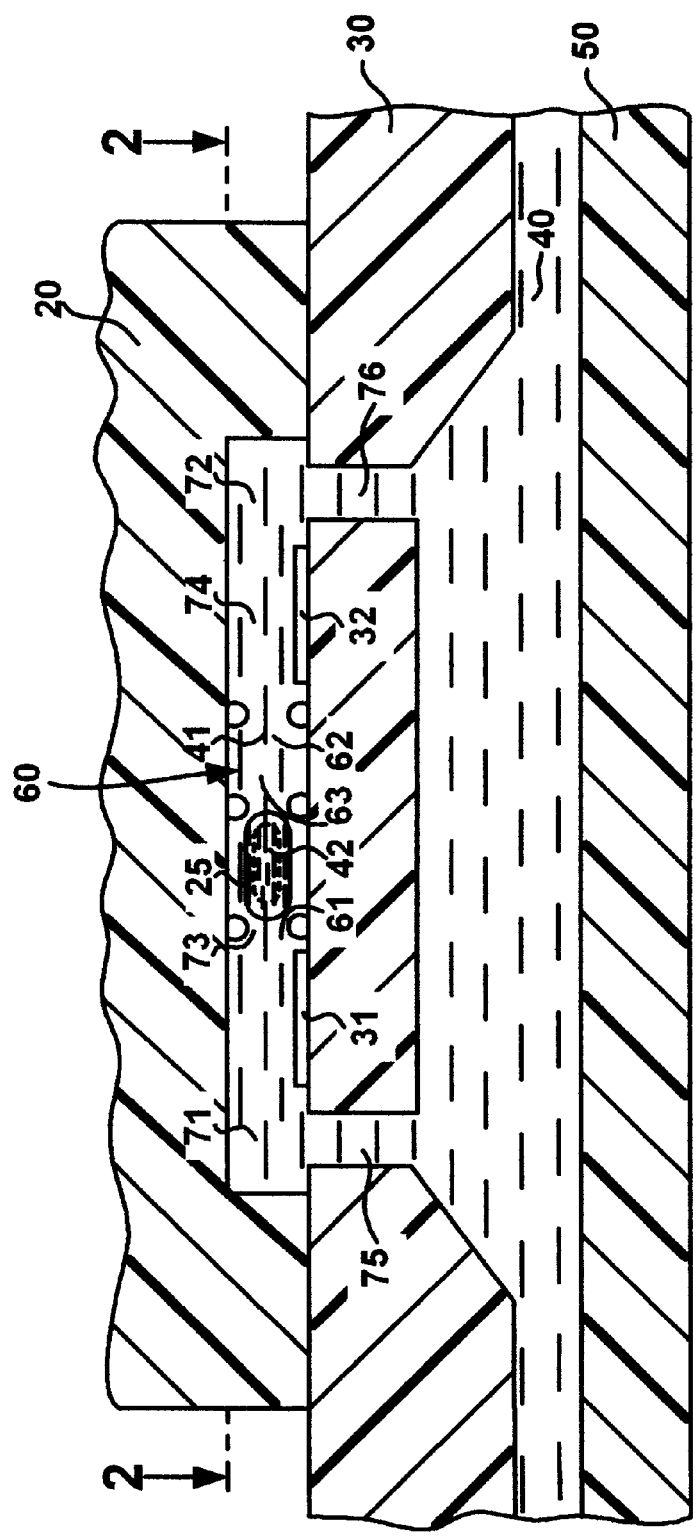
FIG. 1 is an elevational cross-sectional view of a thermal optical switch in accordance with the invention.

In the following detailed description and in the several figures of the drawing, like elements are identified with like reference numerals.

FIG. 1 is a schematic cross-sectional view of the major components of a thermal pressure pulse operated liquid optical switch in accordance with the invention, which by way of specific example is disclosed as element of a cross channel switch array. The optical switch generally includes a waveguide or optical channel plate 20, a heater substrate 30, and a fluid reservoir 40 between the heater substrate 30 and a lower cover 50. A switching conduit or channel 60 is formed in the optical channel plate 20, and is comprised of a switch chamber 61 and a holding chamber 62 that are fluidically interconnected by a flow limiting orifice or hydraulic damper 63.

A first pressure generation chamber 71 formed in the optical channel plate 20 adjacent the switch chamber 61 is fluidically coupled to the switch chamber 61 via a flow limiting orifice 73, and a second pressure chamber 72 formed in the optical channel plate 20 adjacent the second switch chamber 62 is fluidically coupled to the holding chamber 63 via a flow limiting orifice 74. The first pressure generation chamber 71 is further fluidically coupled to a fluid feed through 75 that extends to the fluid reservoir 40, while the second pressure generation chamber 72 is further fluidically coupled to a fluid feed through 76 that extends to the fluid reservoir 40.

A first heater resistor 31 is disposed in the heater substrate 30 adjacent the first pressure generation chamber 71, while a second heater resistor 32 is located in the heater substrate 30 adjacent the second pressure generation chamber 72. By way of illustrative example, the heater substrate 30 comprises a thermal ink jet thin film integrated circuit device (active or passive).

Figure 2:
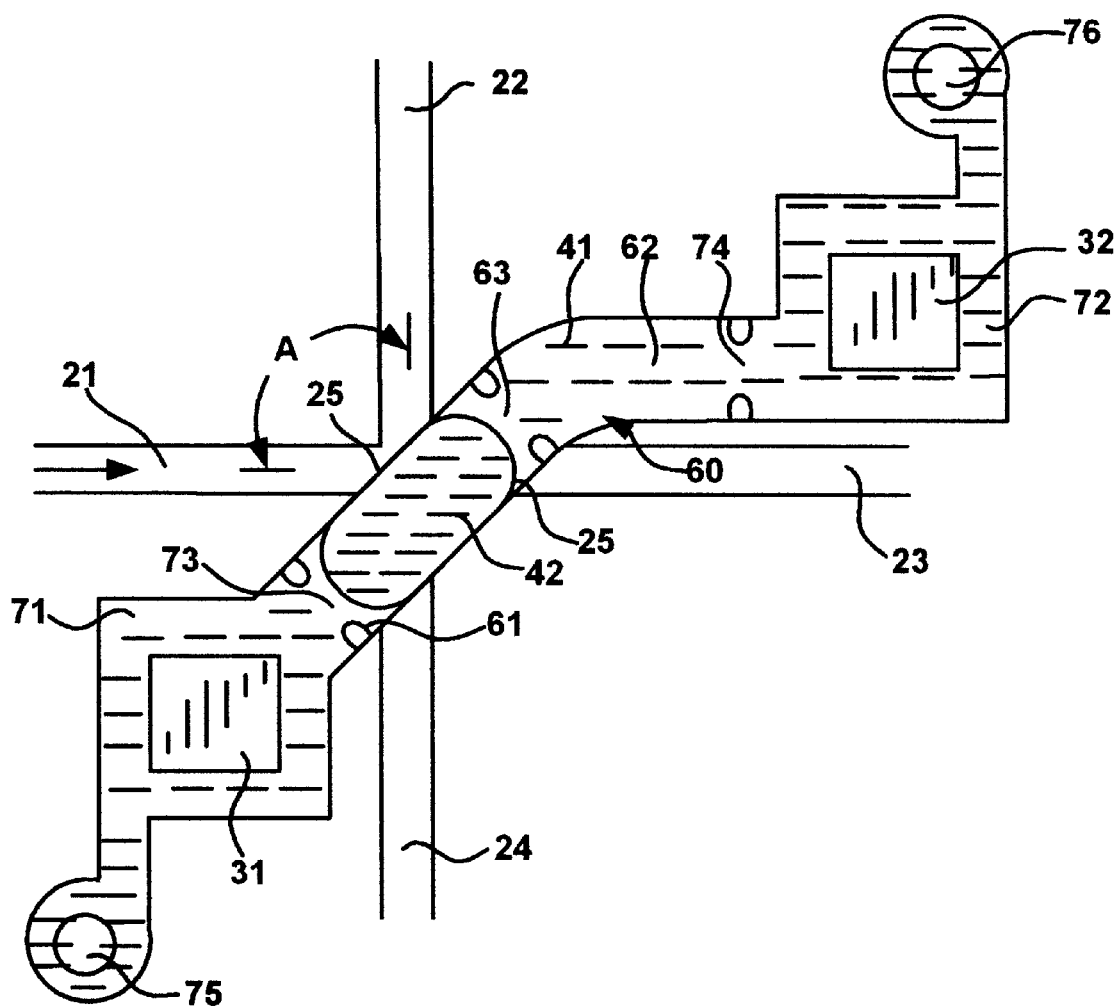
FIG. 2 is a plan view of a specific implementation of the thermal optical switch of FIG. 1.
Figure 3:
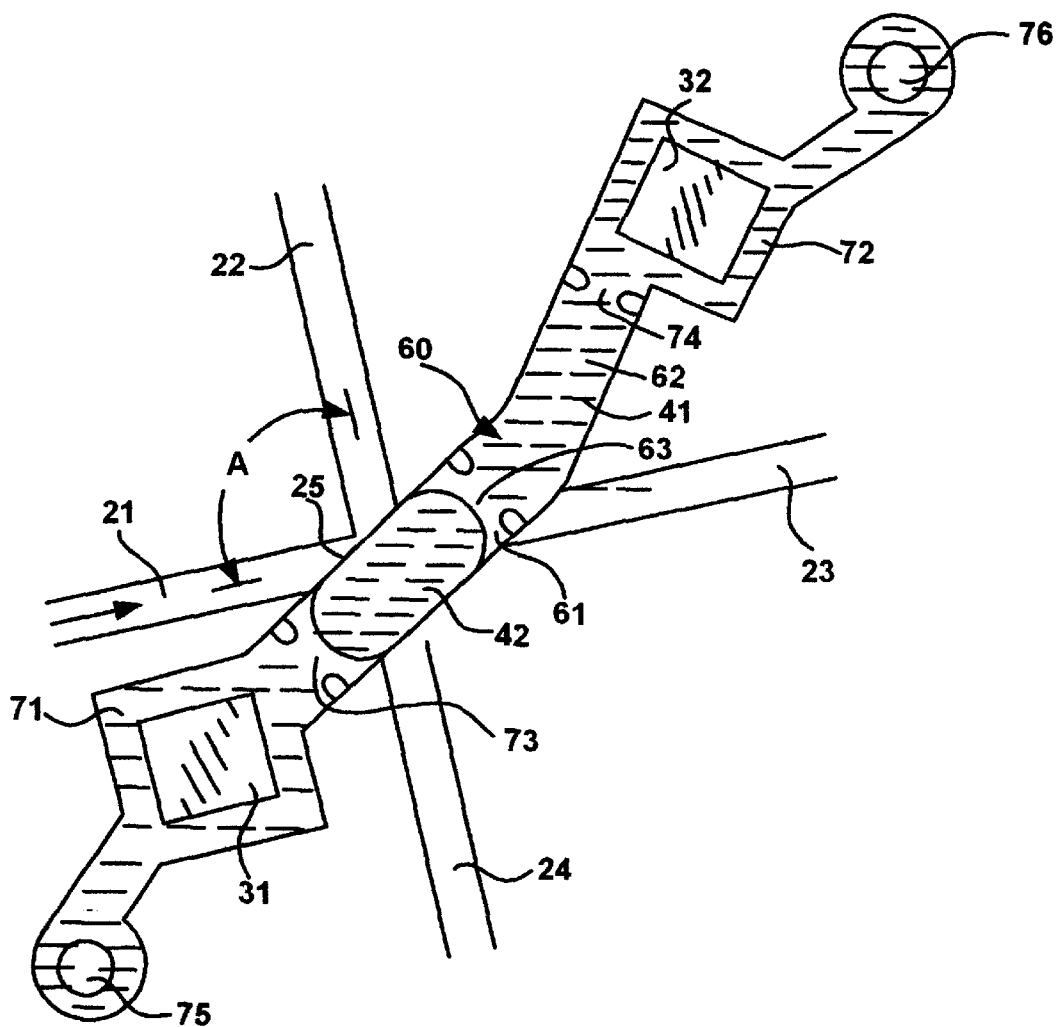
FIG. 3 is a plan view of another implementation of the thermal optical switch of FIG. 1.

Referring also to FIGS. 2 and 3, a first optical channel (or segment) 21 and a second optical channel (or segment) 22 formed in the optical channel plate 20 are coplanar and intersect in a region adjacent the switch chamber 61 and further interface with the switch chamber 61 at a surface 25 that is a portion of a wall of the switch chamber 61. The included angle A between the first optical channel and second optical 22 and the angle of the interface surface 25 are selected so that light traveling in one of the first and second optical channels 21, 22 will be internally reflected into the other of the first and second optical channels when the switch chamber 61 contains a light diverting fluid 42 that is not index of refraction matched to the optical channels 21, 22. Effectively, the switch chamber 61 intersects the first and second optical channels at an interface that provides for internal reflection when the light diverting switching liquid is in the switch chamber. Depending upon the desired polarization of the internally reflected beam, the included angle can be greater than 90 degrees as schematically depicted in FIG. 3.

A third optical channel 23 formed in the optical channel plate 20 and collinear with the first optical channel 21 interfaces the switch chamber 61, and a fourth optical channel 24 formed in the optical channel plate 20 and collinear with the second optical channel 22 interfaces the switch chamber 61. In this manner, the light path between the first optical channel 21 and the third optical channel 23 is controlled by the index of refraction of the fluid in the switch chamber, as is the light path between the second optical channel 22 and the fourth optical channel 24.

By way of illustrative examples, the optical channels comprise optical waveguides or optical fibers.

A thermally vaporizable working fluid 41 that is index of refraction matched to the optical channels is disposed in the fluid reservoir 40, the switching channel 60, the first and second injection chambers 71, 72, and the feed throughs 75, 76. A mass of light diverting switching liquid 42 that is substantially immiscible with the working fluid 41 and not index of refraction matched to the optical channels is disposed in the switching channel 60 in amount sufficient to fill only one of the switch chamber 61 or the holding chamber 62. In other words, the light diverting switching liquid 42 has an index of refraction that is different from the index of refraction of the index matched working fluid 41. The light diverting liquid 42 can comprise a liquid that is capable of redirecting light, including a liquid metal.

In operation, the heater resistors 31, 32 are individually energized to rapidly vaporize a portion of the working fluid 41 that is located in the associated pressure generation chamber (71, 72) to form a drive bubble. The drive bubble causes working fluid to move from the pressure generation chamber in which the bubble was formed into the adjacent chamber (61, 62) of the switching conduit 60. If the mass of light diverting switching liquid 42 is in such adjacent chamber, the mass of light diverting switching liquid 42 will be pushed into the other chamber of the switching conduit. Thus, the mass of light diverting switching liquid 42 can be moved between the switch chamber 61 and the holding chamber 62, and the state of the switch is defined by the location of the mass of light diverting switching liquid 42 within the switching conduit.

Effectively, the first heater resistor 31, its associated pressure generation chamber 71, and the working fluid in the pressure generation chamber 71 form a first pressure pulse generator, while the second heater resistor 32, its associated pressure generation chamber 72, and the working fluid in the pressure generation chamber 72 form a second pressure pulse generator. These pulse generators produce thermally induced pressure pulses that move the mass of light diverting switching liquid 42 to control the state of the switch.

When the mass of light diverting liquid 42 is in the switch chamber 61, the switch can be considered to in a first state, and light travelling in either of the first and second optical channels 21, 22 toward the switch chamber 61 is internally reflected at the interface 25 into the other of the first and second optical channels 21, 22. When the switch chamber 61 contains only index of refraction matching working fluid, the switch is in a second state wherein light travelling in either of the first and third optical channels 21, 23 toward the switch chamber 61 passes through the switch chamber 61 into the other optical channel, and light travelling in either of the second and fourth 22, 24 optical channels toward the switch chamber 61 passes through the switch chamber 61 into the other optical channel. In other words, in the absence of light diverting liquid in the chamber 61, the first and third channels 21, 23 communicate freely, and the second and fourth channels 22, 24 communicate freely. The communication between the first and third channels 21, 23 is independent of the communication between the second and fourth channels 22, 24.

By way of example, the index of refraction matching working fluid comprises meta-pyrrole, mixed alcohols, mixtures of glycols and alcohols, and mixtures of the foregoing and water.

The light diverting liquid comprises more particularly any liquid that is immiscible with the working fluid, has a smooth interface and is sufficiently different in index of refraction to cause the necessary redirection of light, including for example mercury; a low temperature metal alloy such as a gallium/indium mixture; polysilicone liquids; and halogenated hydrocarbon liquids. Specific examples of halogenated hydrocarbon liquids include bormoform, chloroform, and any of the family of polyfluorinated polyethers.

The foregoing has been a disclosure of a reliable and stable thermal bubble optical switch that does not require long term bubble maintenance or periodic resetting of state.

Although the foregoing has been a description and illustration of specific embodiments of the invention, various modifications and changes thereto can be made by persons skilled in the art without departing from the scope and spirit of the invention as defined by the following claims.

What is claimed is:

1. A thermal optical switching element, comprising:

a switch conduit comprised of a first chamber and a second chamber interconnected to said first chamber;

a plurality of optical channels interfacing with said first chamber of said switch conduit;

a working fluid disposed in said conduit and index of refraction matched to said optical channels;

a light diverting liquid that is immiscible with said working fluid and disposed in said conduit, said light diverting liquid having a different index of refraction from said working fluid;

a thermal pressure generator structure fluidically connected to said switch conduit for causing said light diverting liquid to move between said first chamber and said second chamber; and whereby a state of the thermal optical switching element is determined by a location of said light diverting liquid in said conduit.

2. The thermal optical switching element of claim 1 wherein said thermal pressure generator structure comprises:

a first thermal pressure generator fluidically connected to said first chamber for causing said light diverting liquid to move from said first chamber to said second chamber; and a second thermal pressure generator fluidically connected to said second chamber for causing said light diverting liquid to move from said second chamber to said first chamber.

3. The thermal optical switching element of claim 2 wherein said first thermal pressure generator selectively vaporizes a portion of said working fluid to form a drive bubble, and wherein said second thermal pressure generator selectively vaporizes a portion of said working fluid to form a drive bubble.

4. The thermal optical switching element of claim 1 wherein a first pressure pulse generator includes a first heater resistor and a first pressure generation chamber, and wherein a second pressure pulse generator includes a second heater resistor and a second pressure generation chamber.

5. The thermal optical switching element of claim 4 wherein said first heater resistor and said second heater resistor comprise integrated circuit resistors.

6. The thermal optical switching element of claim 4 wherein said switch conduit, a first heater chamber, and a second heater chamber are formed in an optical waveguide plate.

7. The thermal optical switching element of claim 4 wherein said working fluid includes at least one of the following: (a) meta-pyrrole, (b) mixed alcohols, and (c) a mixture of glycols and alcohols.

8. The thermal optical switching element of claim 7 wherein said working fluid further includes water.

9. The thermal optical switching element of claim 4 wherein a switching liquid comprises mercury.

10. The thermal optical switching element of claim 4 wherein a switching liquid comprises a low temperature liquid metal alloy.

11. The thermal optical switching element of claim 4 wherein a switching liquid comprises a polysilicone liquid.

12. The thermal optical switching element of claim 4 wherein a switching liquid comprises a halogenated hydrocarbon liquid.

13. The thermal optical switching element of claim 4 wherein a switching liquid comprises one of the following: (a) bromoform, (b) cholorform, and (c) a polyfluorinated polyether liquid.

14. A method of switching a light beam, comprising:

selectively forming pressure generating bubbles in a working fluid to move a mass of switching liquid between a first fluid chamber and a second fluid chamber;

coupling a light beam in a first optical channel to the first fluid chamber;

coupling a reflected version of the light beam to a second optical channel if the mass of switching liquid is in the first fluid chamber; and coupling a transmitted version of the light beam to a third optical channel if the mass of switching liquid is in the second fluid chamber.

15. The method of claim 14 wherein selectively forming pressure generating bubbles includes selectively heating the working fluid to form pressure generating bubbles.

* * * * *